United States Patent [19]
Komma et al.

[11] Patent Number: 5,379,369
[45] Date of Patent: Jan. 3, 1995

[54] APPARATUS FOR GENERATING STEREOSCOPIC IMAGE AND METHOD THEREFOR

[75] Inventors: Tetsuko Komma, Osaka; Kenji Kimura, Hyogo; Yoshimi Asai; Shiro Suzuki, both of Osaka, all of Japan

[73] Assignee: Sharp Kabushiki Kaisha, Osaka, Japan

[21] Appl. No.: 843,065

[22] Filed: Mar. 2, 1992

[30] Foreign Application Priority Data

Mar. 4, 1991 [JP] Japan .................. 3-037150
  Feb. 25, 1992 [JP] Japan .................. 4-037791

[51] Int. Cl.$^6$ ............................. G06F 15/00
[52] U.S. Cl. ............................. 395/119
[58] Field of Search ........... 395/119, 118, 120, 121; 364/200 MS File, 900 MS File; 345/117, 113

[56] References Cited

FOREIGN PATENT DOCUMENTS 62-293381 12/1987 Japan .
WO-/A8804804 5/1988 WIPO .

OTHER PUBLICATIONS

"Tutorial: Time-Multiplexed Stereoscopic Computer Graphics", Larry F. Hodges, IEEE Computer Graphics and Applications, vol. 12, No. 2, Mar. 1992, pp. 20–23.

*Primary Examiner*—Phu K. Nguyen
*Attorney, Agent, or Firm*—Nixon & Vanderhye

[57] ABSTRACT

Depth information generating section generates depth image information representing the class of the depth of each pixel in two-dimensional image information outputted from an image input section, according to depth information outputted from an input section. A stereoscopic image information generating section generates stereoscopic image information, based on the depth image information and the two-dimensional image information. Thereafter, an image for the left eye and an image for the right eye read by an image information output section are alternately displayed on the screen of an image display section under the control of a gate. In synchronization with the change-over operation of alternately displaying the image for the left eye and the image for the right eye, the stereoscopic section controls the opening and closing of liquid crystal shutters of liquid crystal shutter glasses. A stereoscopic image information correcting section corrects stereoscopic image information in response to image drawing information transmitted from the input section. Thus, a stereoscopic image can be easily generated based on the two-dimensional image information.

17 Claims, 12 Drawing Sheets

LEFT EYE

RIGHT EYE

APPARATUS FOR GENERATING STEREOSCOPIC IMAGE AND METHOD THEREFOR

BACKGROUND OF THE INVENTION

1. Field of the Invention

The present invention relates to an apparatus for generating a stereoscopic image and which is capable of generating a stereoscopic image for presenting a stereoscopic screen display based on two-dimensional image information as well as to a method for generating a stereoscopic image.

2. Description of the Related Art

When a man sees an object with both eyes, the position of the object image reflected on the retina of the left eye is different from the position of the object image reflected on the retina of the right eye. The dislocation of the object image in both eyes causes the man to feel the depth of the object. In order to obtain a stereoscopic image on a monitor screen, it is necessary to obtain image information which dislocates the object image reflected on the retina of the left eye and the object image reflected on the retina of the right eye from each other.

To this end, the following method is carried out conventionally. That is, stereoscopic image information is obtained as follows. The stereoscopic image information comprises two image information. One is used for the right eye for forming an object image on the right eye's retina according to the visual point thereof. The other is used for the left eye for forming an object image on the left eye's retina according to the visual point thereof. The right eye sees the image for the right eye based on the image information for the right eye and the left eye sees the image for the left eye based on the image information for the left eye.

Conventionally, the following two methods are performed to obtain a stereoscopic image based on the stereoscopic image information:

According to a first method, a camera 1 for the left eye and a camera 2 for the right eye pick up the image of a three-dimensional object as shown in FIG. 16 with the visual points differentiated from each other. The image information for the left eye obtained by the camera 1 and the image information for the right eye obtained by the camera 2 are inputted to a video recorder 3.

The video recorder 3 synthesizes the image information for the left eye and the image information for the right eye so as to generate a video signal. The video recorder 3 generates the video signal of an odd number field, based on the image information for the left eye and the video signal of an even number field, based on the image information for the right eye. The video signals thus generated by the video recorder 3 are displayed on a monitor 4 comprising a cathode ray tube (CRT).

An operator sees an image displayed on the monitor 4 through liquid crystal shutters, of liquid crystal shutter glasses 5, which opens and closes under the control of the video recorder 3. In synchronization with the vertical synchronizing signals, the video recorder 3 closes the liquid crystal shutter on the right eye side when odd number fields are displayed and the liquid crystal shutter on the left eye side when even number fields are displayed.

Based on the image displayed on the monitor 4, the operator can see the image for the left eye with the right eye and the image for the right eye with the left eye almost simultaneously. Thus, the image position of the object reflected on the retina of the left eye is different from the image position of the object reflected on the retina of the right eye. Therefore, the operator watches a stereoscopic image on the monitor 4.

According to a second method, the information of each position of an object which is to be stereoscopically represented is indicated by data, and the data is inputted to a stereoscopic image processing section 6 as shown in FIG. 17. Then, based on the data, the image processing section 6 finds a stereoscopic image information comprising image information for the left eye obtained when the object is seen from the visual point of the left eye and image information for the right eye obtained when the object is seen from the visual point of the right eye. The digital image information for the left eye and image information for the right eye are converted into analog image information so as to display the image for the left eye and the image for the right eye on a monitor 7 alternately, similarly to the first method.

Thus, the operator sees the image for the left eye and the image for the right eye alternately displayed on the monitor 7 through liquid crystal shutter glasses 8. Thus, the object viewed by the operator looks stereoscopic.

The above-described conventional method for obtaining a stereoscopic image based on the stereoscopic image information comprising the image information for the left eye and the right eye has, however, the following problems.

That is, according to the first method, it is necessary to form a three-dimensional object so that the object image is taken by the camera 1 for the left eye and the camera 2 for the right eye thus requiring going to the object location so as to photograph an object by the cameras 1 and 2. As such, much time and labor are required to form stereoscopic image information serving as a means for stereoscopically displaying for example, a landscape of a foreign country on the screen.

According to the second method, it is necessary to input the data of a three-dimensional object which is to be stereoscopically represented on the screen to the image processing section 6. However, in order for the image processing section 6 to obtain complicated image information for the left and right eyes, for example, the information of a landscape image, it is necessary to generate a large number of data of three-dimensional objects and input them to the image processing section 6. Thus, a stereoscopic image displayed on the screen by this method is not favorable.

SUMMARY OF THE INVENTION

Accordingly, it is an essential object of the present invention to provide an apparatus capable of easily generating a complicated stereoscopic image such as a landscape and a method for embodying the apparatus.

In accomplishing these and other objects, an apparatus, according to a first embodiment, for generating a stereoscopic image comprises: an image input section for picking up the image of an object and outputting two-dimensional image information indicating the picked-up image; a two-dimensional image information storing section for storing the two-dimensional image information outputted from the image input section; an input section for inputting information for designating the class of the depth at each position in an original image which is based on the two-dimensional image information; a depth information generating section for dividing the depth at each position in the original image according to the depth information inputted from the input section and generating depth information indicating the class of the depth at each pixel in the two-dimensional image information; depth information storing section for storing depth information generated by the depth information generating section; stereoscopic image information generating section for generating stereoscopic image information consisting of image information for, according to a predetermined rule, displaying an image to be viewed from the visual point of the left eye and an image information for displaying an image to be viewed from the visual point of the right eye, based on the two-dimensional image information stored in the two-dimensional image information storing section and the depth information stored in the depth information storing section; a stereoscopic image information storing section for storing the stereoscopic image information generated by the stereoscopic image information generating section; an image display section for reading the image information for the left eye and the image information for the right eye alternately from the stereoscopic image information stored in the stereoscopic image information storing section and performing a switching operation of alternately displaying the image for the left eye and the image for the right eye on the screen thereof at predetermined regular time intervals; shutter-provided glasses to be used to view the image for the left eye and the image for the right eye displayed on the image display section; and a shutter control section, in synchronization with the switching operation performed by the image display section, for closing a right eye side shutter side when the image for the left eye is displayed on the screen of the image display section and closes a left eye side shutter when the image for the right eye is displayed on the screen of the image display section.

According to the apparatus according to the first embodiment, two-dimensional image information indicating the image of an object is outputted from the image input section and stored in the two-dimensional image information storing section. In addition, the depth information of each position in the original image is inputted to the two-dimensional image information storing section. Then, according to the depth information sent from the image input section, the depth information generating section separates the depth at each position of the original image which is based on the two-dimensional image information into a plurality of classes and generates depth information indicating the class of the depth of each pixel in the two-dimensional image information. The depth information is stored by the depth information storing section.

Then, based on the two-dimensional image information and the depth information, the stereoscopic image information generating section generates stereoscopic image information comprising image information for the left eye and that for the right eye according to a predetermined rule. The stereoscopic image information is stored by the stereoscopic image information storing section. The image display section reads the image information for the left eye and that for the right eye. Consequently, an image for the left eye and that for the right eye are alternately displayed on the screen of the image display section. When the image for the left eye is displayed on the screen of the image display section in synchronization with the switching operation of the image display section, the shutter of the glasses positioned on the right eye side is closed under the control of the shutter control section, and similarly, when the image for the right eye is displayed on the screen of the image display section, the shutter of the glasses positioned on the left eye side is closed under the control of the shutter control section.

Thus, the operator can see the image for the left eye with the left eye and the image for the right eye with the right eye almost simultaneously, thus seeing a stereoscopic image.

As described above, upon designation of the class of the depth at each position in the original image by the input of depth information via the input section to the two-dimensional image information storing section, the stereoscopic image information generating section automatically generates the stereoscopic image information, based on the two-dimensional image information. Thus, the stereoscopic image is generated.

In the apparatus according to a second embodiment, as defined in the first embodiment, the depth information generating section includes brightness information generating means for generating depth image information serving as depth information representing the class of the depth of each pixel in the two-dimensional image information by brightness information. In the above construction, the image display section reads out the depth image information as necessary to display the depth image representing the class of the depth at each position in the original image by brightness degree on the screen thereof.

According to the above construction, when the depth information is generated by the depth information generating section, the brightness information generating means generates depth image information representing the class of the depth of each pixel in the two-dimensional image information by brightness information. The depth information is stored in the depth information storing section as depth information. As a result, the image display section reads the depth image information from the depth information storing section so as to display on the screen thereof the depth image which represents the class of the depth at each position in the original image in terms of brightness.

Accordingly, the depth degree of each position in the original image set by the depth information can be visibly displayed on the screen of the image display section by the brightness degree of the depth image.

In the apparatus according to a third embodiment, as defined in the first or second embodiment, in addition to the depth information, the input section inputs image drawing information for a stereoscopic image which is based on the stereoscopic image information generated by the stereoscopic image information generating section. The apparatus further comprises: a stereoscopic image information correcting section for, based on the image drawing information inputted by the input section, correcting the stereoscopic image information by generating the image information of a dead angle region which cannot be seen in the original image but can be viewed in the image for the left eye and the right eye by the movement of the visual point according to a predetermined procedure.

According to the above construction, after the stereoscopic image information generating section generates stereoscopic image information which is then stored in the stereoscopic image information storing section. Thereafter, the input section inputs image drawing information. Based on the image drawing information, the stereoscopic image information correcting section corrects the stereoscopic image information stored in the stereoscopic image information storing section by generating the image information of a dead angle region which is not visible in the original image but visible in the image for the left eye and that for the right eye due to the shift of the visual point.

Thus, fine stereoscopic image information which provides such a complicated configuration such as the image of a landscape can be generated based on two-dimensional image information.

In the apparatus according to a fourth embodiment, as defined in any one of the first through third embodiments, the image input section includes image drawing means for generating two-dimensional image information representing the image of the object, based on the image drawing information for the object inputted by the input section.

According to the above construction, the image drawing information of the object is inputted via the input section. As a result, based on the image drawing information, two-dimensional image information representing the image of the object is generated by the image drawing means of the image input section and stored in the two-dimensional image information storing section.

Therefore, based on the image drawing information inputted by the input section, the stereoscopic image information of a picture such as an illustration is generated.

In the apparatus according to a fifth embodiment, as defined in any one of the first through the fourth embodiments, the stereoscopic image information storing section is composed of external storing means.

According to the above construction, the stereoscopic image information generated by the stereoscopic image information generating section is stored in the stereoscopic image information storing section comprising the external storing means.

Therefore, the stereoscopic image information stored in the stereoscopic image information storing section is retained. Thus, a stereoscopic image which is based on the retained stereoscopic image information is repeatedly displayed as necessary.

A method, according to a sixth embodiment, for generating a stereoscopic image consisting of an image for the left eye to be viewed from the visual point thereof and an image for the right eye to be viewed from the visual point thereof comprises the steps of: generating two-dimensional image information representing the image of an object; separating the depth at each position in an original image which is based on the two-dimensional image information into a plurality of classes and generating depth information representing the class of the depth of each pixel in the two-dimensional image information; finding the parallax of a pixel in left eye-image information for displaying an image for the left eye and that of a corresponding pixel in right eye-image information for displaying an image for the right eye, based on the depth information; generating stereoscopic image information consisting of the image information for the left eye and the image information for the right eye, based on the parallax found and the two-dimensional image information; and displaying the image for the left eye which is based on the left eye-image information and the image for the right eye which is based on the right eye-image information alternately at predetermined regular time intervals.

A method, according to a seventh embodiment, for generating a stereoscopic image as defined in the sixth embodiment, comprises the steps of: generating depth image information representing the class of the depth of each pixel in the two-dimensional image information as depth information; displaying depth image representing the class of the depth at each position in the original image as necessary based on the depth image generated information; and finding the parallax of a pixel in the left eye-image information and that of a corresponding pixel in the right eye-image information, based on the depth image information serving as the depth information by assuming that a position corresponding to a brighter pixel of the depth image information is forward in the original image and a position corresponding to a darker pixel of the depth image information is backward in the original image.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE INVENTION

Figure 1:
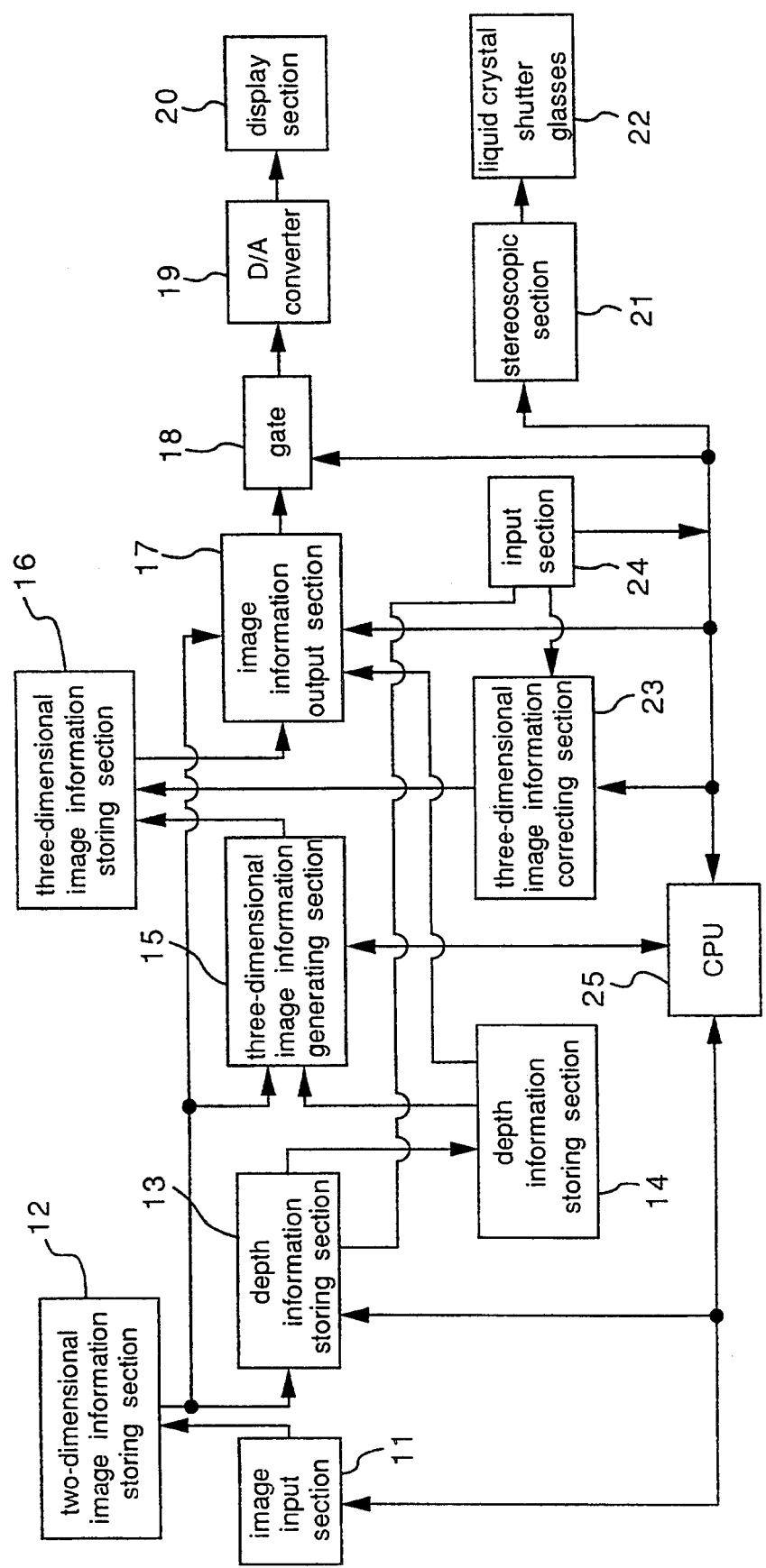
FIG. 1 is a block diagram of an apparatus for generating a stereoscopic image according to an embodiment of the present invention.

Before the description of the present invention proceeds, it is to be noted that like parts are designated by like reference numerals throughout the accompanying drawings.

The present invention is intended to easily generate a stereoscopic image information comprising image information for the left eye and image information for the right eye based on two-dimensional image information and display a stereoscopic image on a monitor screen based on the stereoscopic image information thus generated.

An apparatus for generating a stereoscopic image according to an embodiment of the present invention is described below with reference to FIG. 1 showing the block diagram of the apparatus. An image input section 11 comprising a camera and an image scanner picks up the image of in object or that of an original document which is to be represented in three dimensions, thus outputting digital two-dimensional image information indicating the picked-up original image. A two-dimensional image information storing section 12 stores the two-dimensional image information outputted from the image input section 11. As will be described later, a depth information generating section 13 comprising a brightness information generating means (not shown) generates depth image information indicating the depth of the object of the original image, by means of brightness information, based on the two-dimensional image information stored in the two-dimensional image information storing section 12. A depth information storing section 14 stores the depth image information thus generated.

Based on the two-dimensional image information stored in the two-dimensional image information storing section 12 and the depth image information stored in the depth information storing section 14, a stereoscopic image information generating section 15 generates digital stereoscopic image information comprising image information for the left eye and image information for the right eye. A stereoscopic image information storing section 16 stores the stereoscopic image information thus generated. An image information output section 17 reads the digital stereoscopic image information comprising image information for the left eye and image information for the right eye, thus outputting them to a D/A converter 19 through a gate 18. The gate 18 performs a switching operation of alternately outputting the image information for the left eye and the image information for the right eye with each other to the D/A converter 19 at regular time intervals.

In addition to the above operation, the image information output section 17 reads the two-dimensional image information stored in the two-dimensional image information storing section 12 and the depth image information stored in the depth information storing section 14, thus outputting them to the D/A converter 19 through the gate 18. In this operation, the gate 18 outputs the two-dimensional image information and the depth image information to the D/A converter 19 without performing the above-described switching operation.

In response to the digital image information for the left eye and the right eye, the D/A converter 19 converts them into analog image information. An image display section 20 comprising a cathode ray tube (CRT) alternately displays the image for the left eye based on the analog image information for the left eye thus obtained and the image for the right eye based on the analog image information for the right eye thus obtained. The D/A converter 19 converts the inputted digital two-dimensional image information and the digital depth image information into analog image information, respectively. The original image based on the analog two-dimensional image information or a depth image based on the analog depth image information is displayed on the image display section 20.

A stereoscopic section 21 controls the opening and closing of liquid crystal shutters of liquid crystal shutter glasses 22 as described below. That is, when the image for the left eye is displayed on the monitor screen of the image display section 20, the stereoscopic section 21 closes the right eye side shutter of the liquid crystal shutter glasses 22 while when the image for the right eye is displayed thereon, the stereoscopic section 21 closes the left eye side shutter of the liquid crystal shutter glasses 22. Thus, an operator can see a stereoscopic image through the liquid crystal shutter glasses 22.

According to image drawing information including an image drawing content and an image drawing instruction outputted from an input section 24 comprising a key board and a mouth, a stereoscopic image information correcting section 23 corrects the stereoscopic image information generated by the stereoscopic image information generating section 15 as described in detail later.

A CPU 25 controls the image input section 11, the depth information generating section 13, the stereoscopic image information generating section 15, the image information output section 17, the gate 18, the stereoscopic section 21, and the stereoscopic image information correcting section 23, thus forming a stereoscopic image.

The CPU 25 generates a vertical synchronizing signal for taking the vertical synchronization of images to be displayed on the image display section 20. The CPU 25 controls the gate 18 and the stereoscopic section 21 in synchronization with the vertical synchronizing signal in displaying the image for the left eye and the image for the right eye on the image display section 20 alternately with each other.

That is, the image display section 20 comprises the image information output section 17, the gate 18, and the D/A converter 19. The stereoscopic section 21 constitutes a shutter control section.

Figure 2:
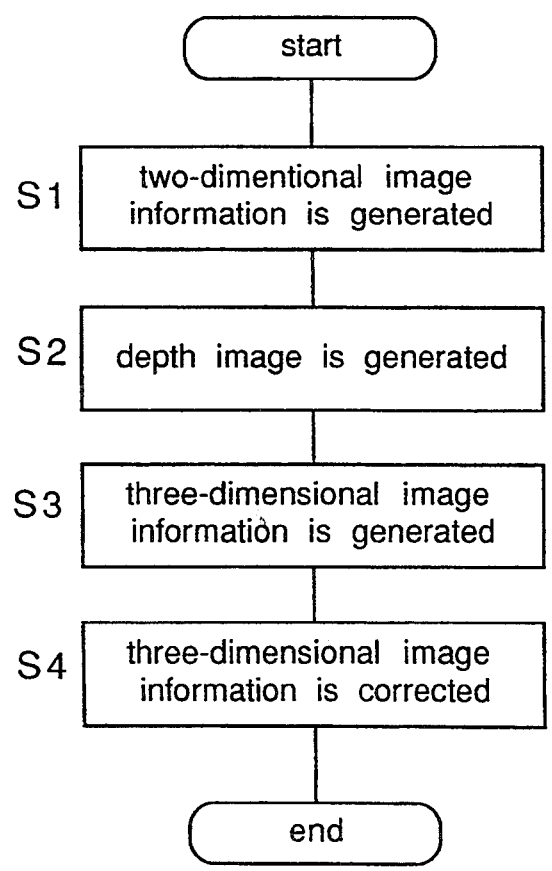
FIG. 2 is a flowchart of an operation for generating stereoscopic image information.

The operation, to be executed under the control of the CPU 25, for generating the stereoscopic image information is briefly described below with reference to FIG. 2 showing the flowchart of the operation.

At step S1, the image input section 11 picks up an object image which is to be represented stereoscopically and generates the two-dimensional image information of the original image of the object thus picked up. Then, the two-dimensional image information storing section 12 stores the two-dimensional image information thus generated.

At step S2, the depth information generating section 13 reads the two-dimensional image information from the two-dimensional image information storing section 12, thus generating the depth image information according to the instruction of the input section 24. Then, the depth information storing section 14 stores the depth image information thus generated.

At step S3, the stereoscopic image information generating section 15 reads the two-dimensional image information from the two-dimensional image information storing section 12 and the depth image information from the depth information storing section 14. Based on both image and depth information, the stereoscopic image information generating section 15 generates stereoscopic image information comprising the image information for the left eye and the image information for the right eye. Then, the stereoscopic image information storing section 16 stores the stereoscopic image information thus generated.

At step S4, the stereoscopic image information correcting section 23 corrects the stereoscopic image information stored in the stereoscopic image information storing section 16 based on the instruction of the input section 24.

Thereafter, the operation for generating the stereoscopic image information terminates.

The depth image information is described below. The depth image information indicates the depth of each object in the original image. According to this embodiment, the depth of each object in the original image which is based on the two-dimensional image information is classified as follows: A value "31" indicating the brightest degree is given to the pixel of an object foremost in the original image and a value "0" indicating the darkest degree is given to the pixel of an object rearmost positioned therein. Thus, according to the depth image information, a position corresponding to a brighter pixel is closest to the image input in the original image and a position corresponding to a darker pixel is positioned further from the image input section.

The depth image information is generated as follows: That is, the input section 24 inputs, to the depth information generating section 13 through a mouse thereof, depth information designating the class of the depth degree of each region in the original image which is based on the two-dimensional image information stored in the two-dimensional image information storing section 12. In response to the depth information outputted from the input section 24, the depth information generating section 13 separates the depths of respective positions in the original image into a plurality of classes (hereinafter referred to as depth gradation.) According to the depth gradation of each pixel in the original image, brightness information is given to each pixel in the form of a pixel value. Thus, the depth image information representing the depth gradation of each pixel in the two-dimensional image information in the form of brightness information is generated.

Figure 3:
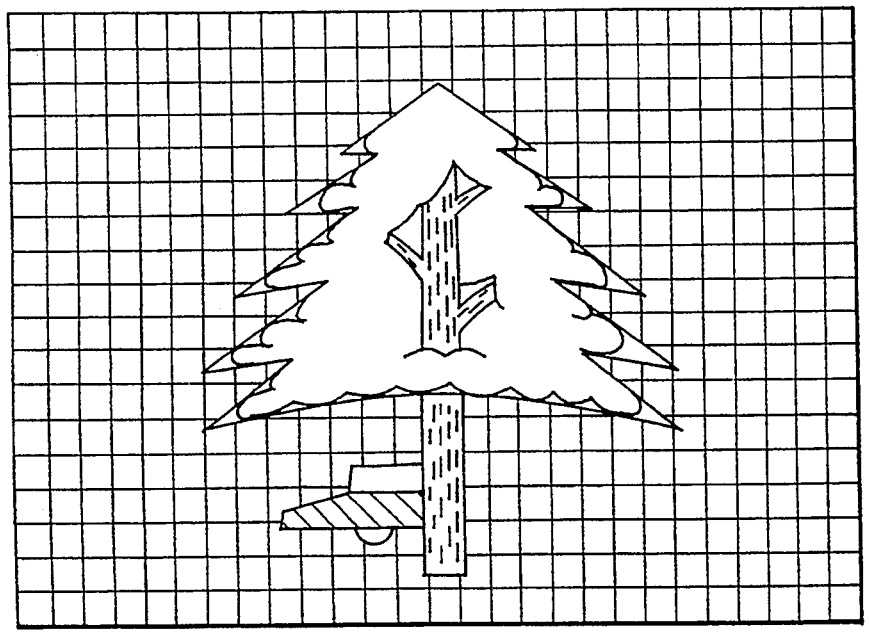
FIG. 3 is a view showing an example of an original image generated by a two-dimensional image information inputted via an image inputting section shown in FIG. 1.
Figure 4:
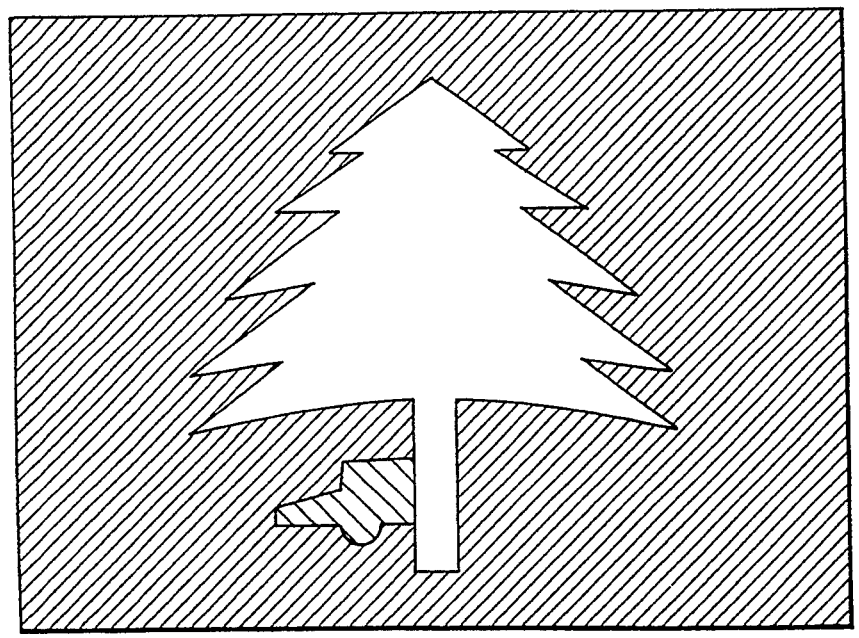
FIG. 4 is a view showing an example of a depth image which is based on the original image shown in FIG. 3.

Depth image information is given to the original image as shown in FIG. 3 as follows: Supposing that "tree" is foremost in the original image; "background" is rearmost therein; and "automobile" is intermediate between the position of "tree" and that of "background", depth image information "30" is given to the pixel of "tree"; depth image information "25" is given to the pixel of "automobile"; and depth image information "0" is given to the pixel of "background". Based on the image information, namely, brightness information indicating a depth gradation value thus obtained, it is possible to obtain a depth image which represents the depth degree at each position in the original image as shown in FIG. 4 in the form of brightness degree. Referring to FIG. 4, the brightest region having "30" as its depth image information is represented in white and the darkest region having "0" as its depth image information is represented with hatching.

In the stereoscopic image thus generated based on the above depth image information, "tree" having "30" as its depth image information and "automobile" having "25" as its depth image information are more forward in the original image than "background" having "0" as its depth image information.

Each depth image information (depth gradation value) is stored in a corresponding address of the depth information storing section 14 as the pixel values of the depth image.

The depth of each pixel of the two-dimensional image information is represented by the depth image information expressed by brightness information. Thus, the depth image based on the depth image information can be displayed on the image display section 20. Thus, according to the brightness degree of the depth image displayed on the image display section 20, the operator can generate stereoscopic image by checking the depth degree at each position in the original image.

Thus, according to this embodiment, imaging a three-dimensional configuration which is to be generated, the operator can set the depth gradation of each position in the original image. Hence, the operator can easily generate a favorable stereoscopic image.

The stereoscopic image information generating section 15 generates the stereoscopic image information as follows based on the two-dimensional image information and the depth image information thus obtained.

Figure 5:
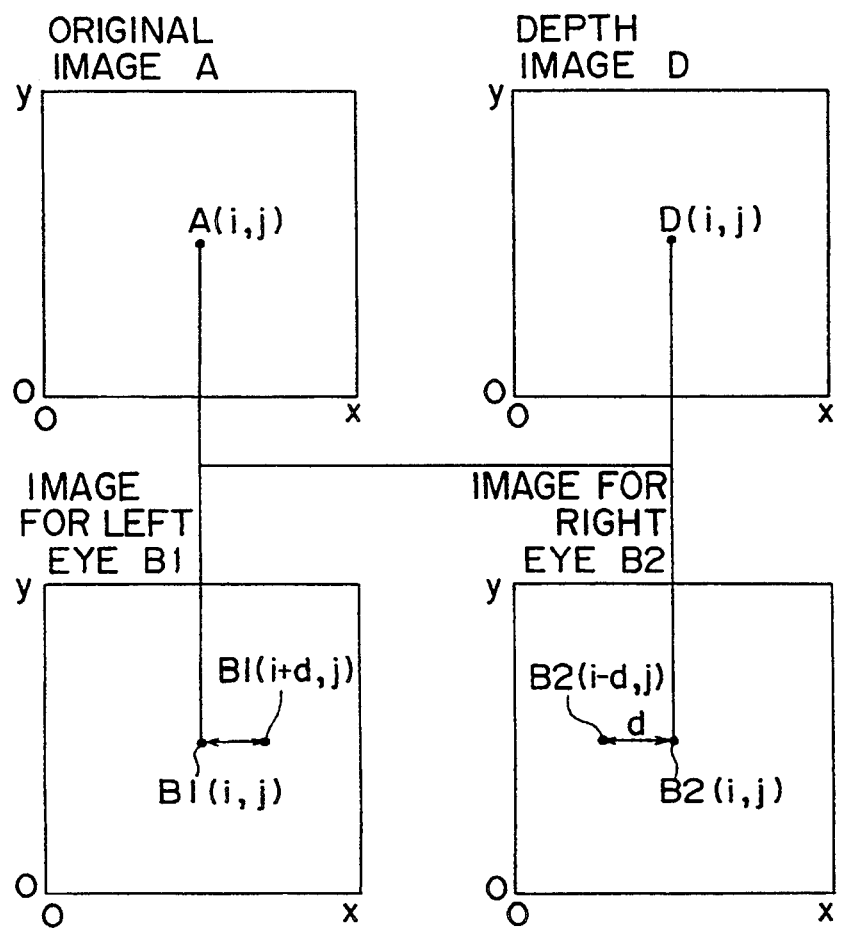
FIG. 5 is an illustration showing the method for generating image information for the left eye and that for the right eye.

Referring to FIG. 5, the number of pixels of an original image (A) based on the two-dimensional image information is horizontally (x) and vertically (y). Similarly, the number of pixels of a depth image (A) based on the depth image information is horizontally (x) and vertically (y). Let it be supposed that the coordinate of a pixel of the original image (A) is (i, j) ($0 \leq i < x$, $0 \leq j < y$). As described above, the position of each pixel in the image region is not altered when the depth image information for generating the depth image is generated based on the two-dimensional image information indicating the original image (A). Therefore, the pixel of the depth image (D) corresponding to the pixel A (i, j) in the original image (A) can be expressed by D(i, j).

Let it be supposed that the value of the pixel A(i, j) of the original image (A) is "$A_{ij}$" and the value (namely, depth gradation value) of the pixel D(i, j) of the depth image (D) is "$D_{ij}$". Image information for the left eye and image information for the right eye are obtained as follows based on the value "$A_{ij}$" of the pixel A(i, j) in the original image (A) and the value "$D_{ij}$" of the pixel D (i, j) of the depth image (D).

The image for the left eye means the image of an object viewed from the visual point of the left eye. As a result, the object image for the left eye is positioned on the right side by ½ of parallax with respect to the position of the object in the original image. Similarly, the image for the right eye means the image of an object viewed from the visual point of the right eye. As a result, the object image for the right eye is positioned on the left side by ½ of parallax with respect to the position of the object in the original image.

As a result, the operator feels the depth of the object depending on the degree of the sum (namely, parallax) of the dislocation amount, or the distance of the object image for the left eye and the right eye with respect to the position of the object in the original image. That is, the operator feels that an object having a larger dislocation amount with respect to the position of the object in the original image is more forward in the screen than an object having a smaller dislocation amount.

Therefore, the stereoscopic image information can be generated by determining the dislocation degree of the object image for the left eye and the right eye with respect to the position of the object image in the original image, based on the depth image information.

Referring to FIG. 5, a pixel B1(i+d, j) of the image B1 for the left eye is spaced from a pixel B1(i, j) coinciding with the position of the pixel A(i, j) in the original image (A) by a distance (d) equal to ½ of parallax. The pixel B1(i+d, j) of the image for the left eye B1 is expressed in terms of the pixel A(i, j) of the original image (A). The distance (d) between the pixel B1(i, j) and the pixel Bl(i+d, j) in X-direction is set by the following equation 1:

$$d = D_{IJ} \times rate \text{ (rate: positive real number)} \quad (1)$$

The value $B1_{(i+d)j}$ of the pixel B1(i+d, j) of the image B1 for left eye is set to the value $A_{ij}$ of the pixel A(i, j) of the original image (A). Similarly, The pixel B2(i-d, j) of the image for the right eye B2 is expressed in terms of the pixel A(i, j) of the original image (A), and the value $B1_{(i-d)j}$ of the pixel B2(i-d, j) of the image B2 for right eye is set to the value $A_{ij}$ of the pixel A(i, j) of the original image (A).

The pixel value $A_{IJ}$ of the original image (A) consists of three components R (red), G (green), and B (blue) which take an integer selected from "0" to "31".

Figure 6A:
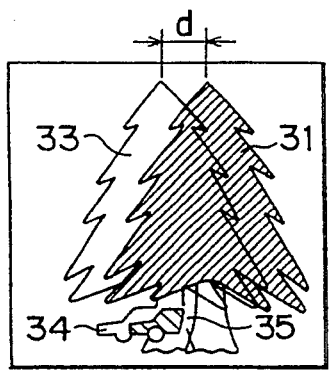
FIGS. 6(a) and 6(b) are illustrations showing the method, for generating image information for the left eye and image information for the right eye, based on the original image shown in FIG. 3 and the depth image shown in FIG. 4.
Figure 6B:
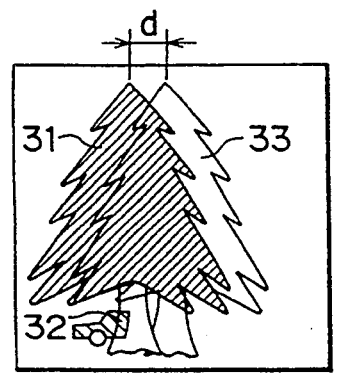

As shown in FIG. 6a, the image for the left eye generated based on the two-dimensional image information representing the original image shown in FIG. 3 and the depth image information representing the depth image shown in FIG. 4 is spaced in the right side with respect to the position of "tree" in the original image shown in FIG. 3 by the distance (d) according the depth image information "30" (depth gradation value) of "tree" shown in FIG. 4. As shown in FIG. 6b, the image for the right eye generated similarly to the image for the left eye is spaced in the left side with respect to the position of "tree" in the original image shown in FIG. 3 by the distance (d).

According to the embodiment, the operator can generate the stereoscopic image easily by only designating the gradation value of each region in the original image through the input section 24 without generating/inputting a large number of data of three-dimensional configuration.

The distance (d) of each pixel of the image information for the left eye or the right eye varies depending on the depth degree of each object. Accordingly, a region in which the images of objects overlap with each other is generated in the image for the left eye and the image for the right eye, respectively. Referring to FIGS. 6a and 6b, in the region 31 in which the screen image region (d=0) of "tree" and that of "background" overlap with each other, there is a possibility that the image of "tree" which is more forward than "background" is hidden by "background". In order to prevent this, the stereoscopic image information generating section 15 executes the following processing:

That is, in writing the image information for the left eye and that for the right eye into the stereoscopic image information storing section 16, first, the value of a pixel for representing a rearmost object "background" is written. Then, the value of a pixel for representing the most forward object "tree" is written.

In other words, the image information for the left and right eyes based on a smaller value of the depth image information is written into the stereoscopic image information storing section 16 earlier than that based on a greater value of the depth image information.

Thus, referring to FIGS. 6a and 6b, in the region 31 in which the screen image region of "tree" and that of "background" overlap with each other, the image information of "background" written into the stereoscopic image information storing section 16 at an address thereof corresponding to the region 31 is replaced with the image information of "tree". As a result, as shown in FIGS. 6a and 6b, the image of the foremost object "tree" is displayed in the region 31.

A similar processing is also executed each in the region 32 in which the screen image of the foremost object "tree" and that of the intermediate object "automobile" overlap with each other and in the region (not shown) in which the screen image of the intermediate object "automobile" and that of the rearmost object "background" overlap with each other.

Figure 7:
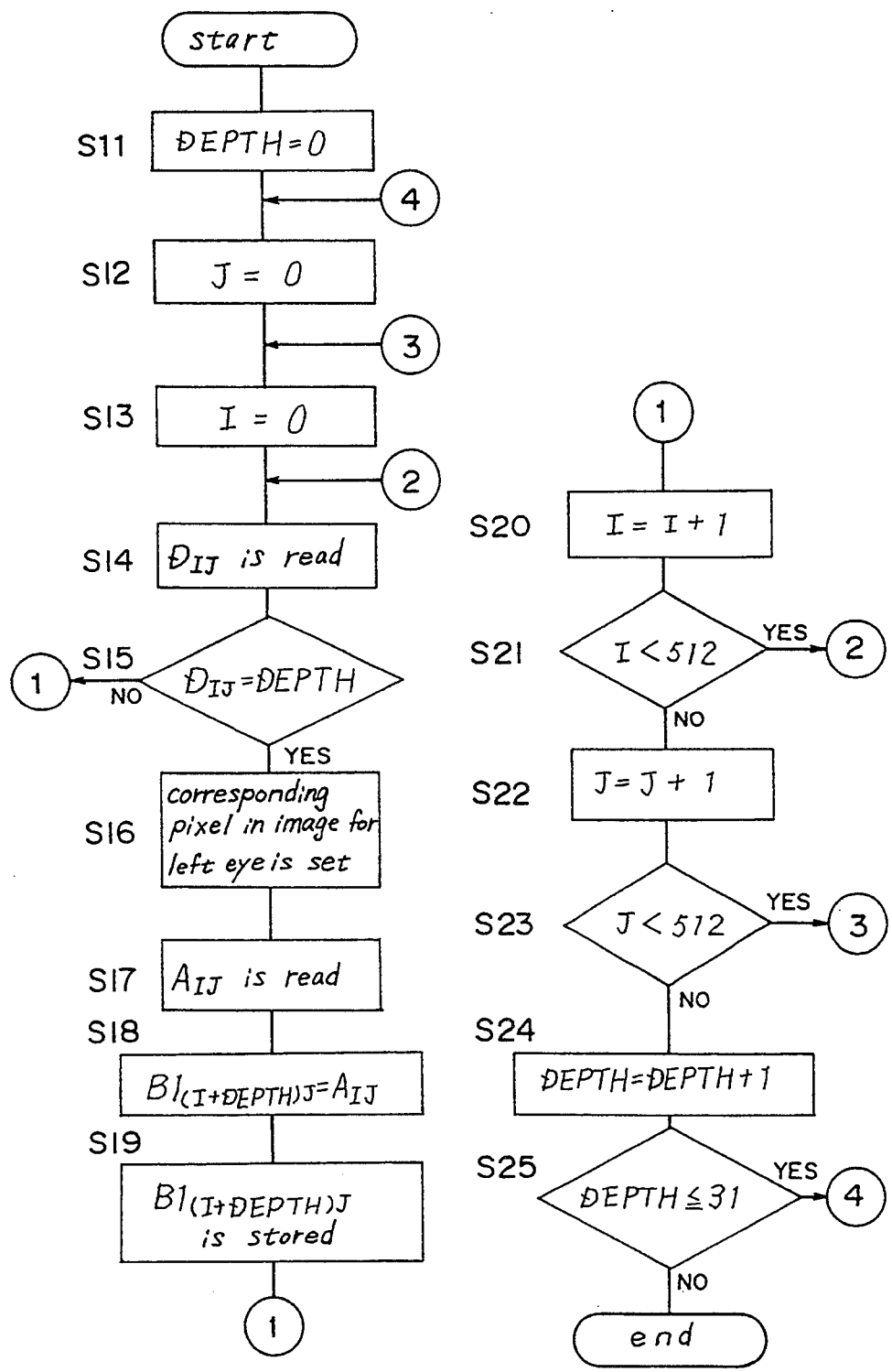
FIG. 7 is a flowchart of an operation for generating the image information for the left eye.

Operation, for generating the image information for the left eye, to be executed under the control of the CPU 25 is described in detail with reference to a flowchart shown in FIG. 7. The number of pixels of the original image (A) and that of the depth image (D) are horizontally and vertically "512", respectively. The number of depth gradations is "32".

At step S11, depth gradation value DEPTH is set to "0" which is a minimum value of the depth gradation.

At step S12, vertical pixel number (J) is set to "0". The pixel of the above vertical pixel number (J) is the pixel of the original image (A) and that of the pixel of the depth image (D) corresponding to the original image (A).

At step S13, horizontal pixel number I is set to "0".

At step S14, the stereoscopic image information generating section 15 reads, from the depth information storing section 14, the depth image information (brightness information: depth gradation value) "$D_{IJ}$" equal to the value of the pixel D(i, j) of the depth image (D).

At step S15, it is decided whether or not the content of the pixel value "$D_{IJ}$" read at step S14 is the same as that of the depth gradation value DEPTH. If yes, the program goes to step S16. If no, the program goes to step S20.

At step S16, the pixel of the image for the left eye B1 corresponding to the pixel A(i, j) of the original image (A) is set to "B1(1+DEPTH, J)".

That is, in this case, rate=1 in the equation 1.

At step S17, the value "$A_{IJ}$" of the pixel A(i, j) of the original image (A) is read from the two-dimensional image information storing section 12.

At step S18., the value $B1_{(1+DEPTH)J}$ of the pixel B1(1+DEPTH) in the image B1 for the left eye is set to the pixel value "$A_{IJ}$" of the pixel A(i, j) in the original image (A).

At step S19, the stereoscopic image information storing section 16 stores the pixel value $B1_{(1+DEPTH)J}$ at an address thereof corresponding to the pixel B1(1+DEPTH, J) of the image B1 for the left eye.

At step S20, the content of the horizontal pixel number I is incremented by "1".

At step S21, it is decided whether or not the content of the horizontal pixel number (I) is smaller than the maximum pixel number "512". If yes, the program returns to step S14 at which a subsequent pixel is horizontally processed. If no, the program goes to step S22.

At step S22, the content of the vertical pixel number J is incremented by "1".

At step S23, it is decided whether or not the content of the vertical pixel number (J) is smaller than the maximum pixel number "512". If yes, the program returns to step S13 at which a subsequent pixel is vertically processed. If no, the program goes to step S24.

At step S24, the content of the depth gradation value DEPTH is incremented by "1".

At step S25, it is decided whether or not the content of the depth .gradation value DEPTH is smaller than the maximum value "31" (corresponding to (depth gradation number - 1) of the depth gradation. If yes, the program returns to step S12 at which processing of a subsequent depth gradation value is executed. If no, the operation for generating the image information for the left eye terminates.

According to the operation for generating the image information for the left eye, pixels having the same depth gradation value are retrieved from the pixels of the original image (A) in the order from those (the rearmost object "background") having a lower depth gradation value to those having a higher one. Then, the pixel of the image B1 for the left eye corresponding to the retrieved pixel of the original image (A) and the value of the pixel of the image B1 are set based on the depth gradation value and the pixel value of the original image (A).

Figure 8:
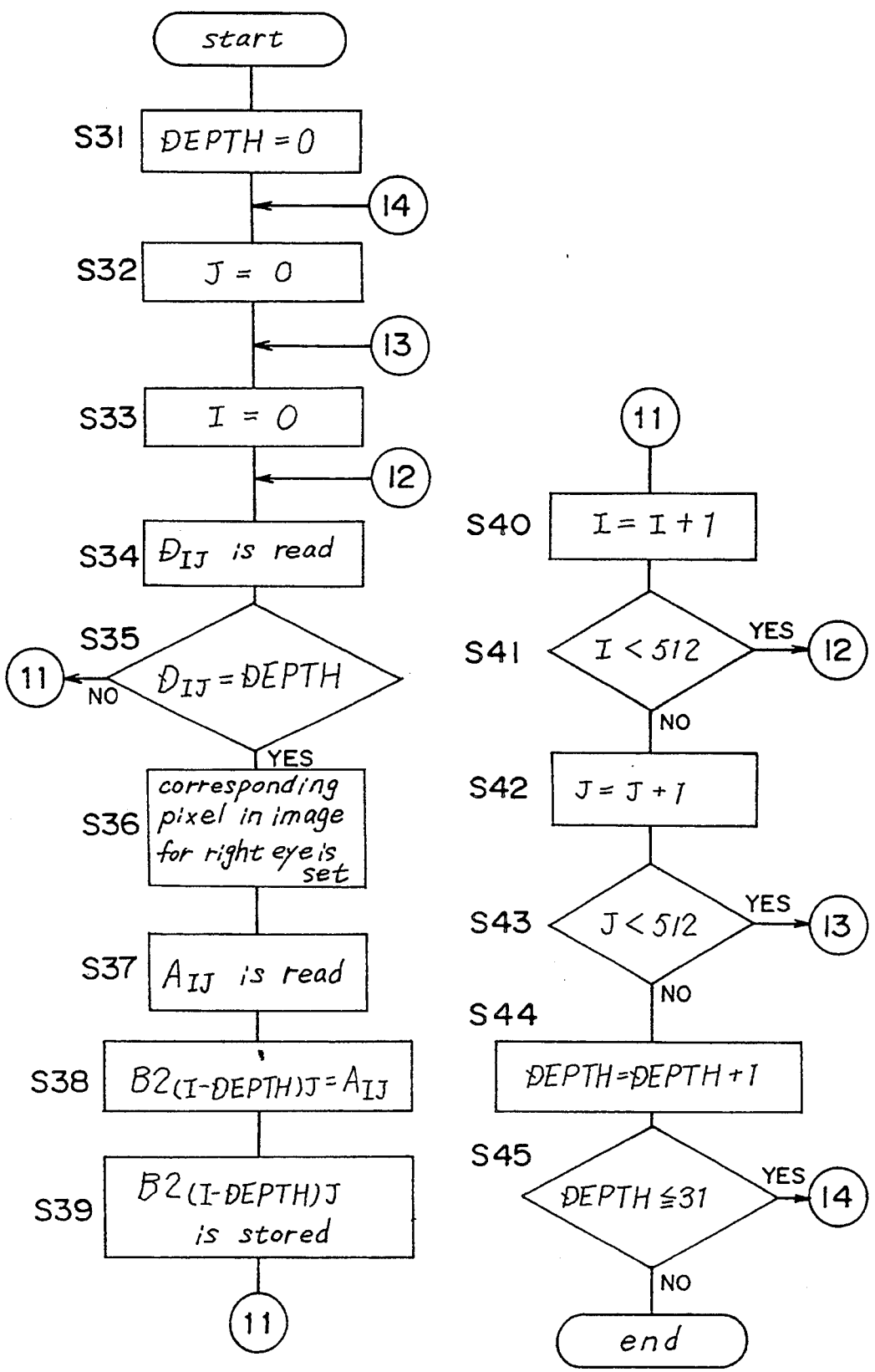
FIG. 8 is a flowchart of an operation for generating the image information for the right eye.

FIG. 8 is the flowchart of the operation, for generating the image information for the right eye, to be executed under the control of the CPU 25. Similarly, the number of pixels of the original image (A) and that of the depth image (D) are horizontally and vertically "512", respectively and the number of depth gradations is "32".

The flowchart of the operation for generating the image information for the right eye is similar to that of the operation for generating the image information for the left eye except the following steps.

At step S36, the pixel of the image for the right eye B2 corresponding to the pixel A(I, J) of the original image (A) is set to "B2(1-DEPTH, J)".

At step S38, the value $B1_{(1-DEPTH)J}$ of the pixel B2(1+DEPTH) in the image B2 for the right eye is set to the pixel value "$A_{IJ}$" of the pixel A(i, j) in the original image (A).

At step S39, the stereoscopic image information storing section 16 stores the pixel value $B2_{(1-DEPTH)J}$ at an address thereof corresponding to the pixel B2(1-DEPTH, J) of the image B2 for the right eye.

Figure 9:
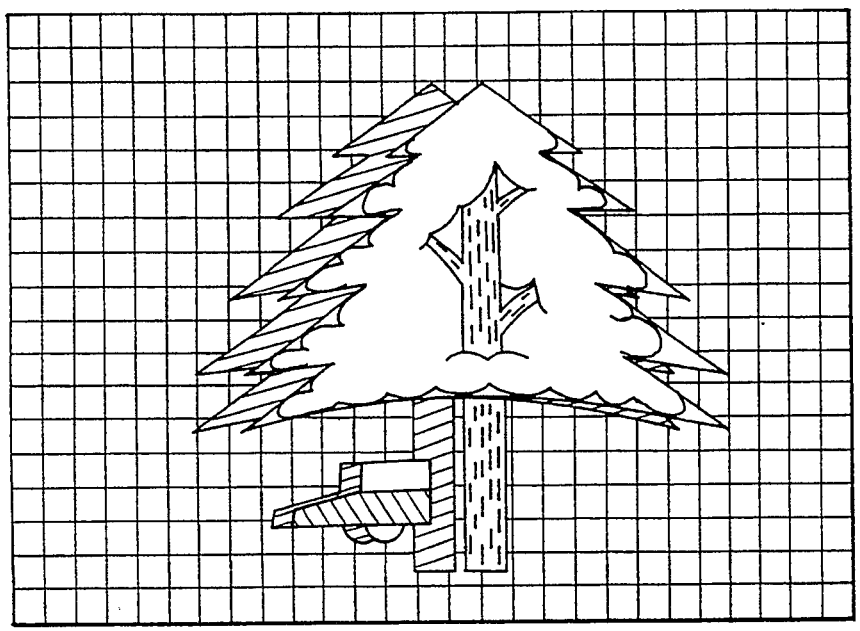
FIG. 9 is a view showing an example of an image for the left eye formed based on the original image shown in FIG. 3.
Figure 10:
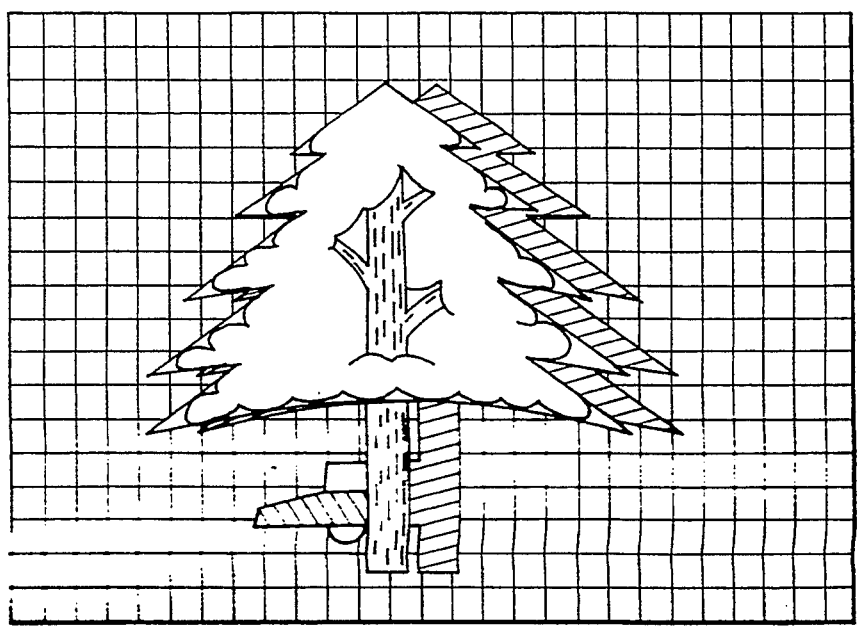
FIG. 10 is a view showing an image for the right eye formed based on the original image shown in FIG. 3.

An example of the image for the left eye generated based on the image information for the left eye generated by the above-described algorithm is shown in FIG. 9 in relation to the original image shown in FIG. 3. Similarly, an example of the image for the right eye generated based on the image information for the right eye is shown in FIG. 10.

The image information for the left eye and the image information for the right eye are corrected as described below.

As described previously, the distance (d) of a pixel of the image information for the left and right eyes depends on the depth degree of an object. The image information for the left eye and that for the right eye have a region (dead angle region) in which image information is not generated between the screen images of objects, respectively. The two-dimensional image information does not includes image information of the dead angle region because the dead angle region is in the dead angle of an object located forward in the original image. Referring to FIGS. 6a and 6b, the following copying processing or image drawing processing is executed to prevent an image from not being formed in the dead angle region 33 generated between the screen image region of "tree" and that of "background", the dead angle region 34 generated between the screen image region of "automobile" and that of "background", and the dead angle region 35 generated between the screen image region of "automobile" and that of "tree".

The value of the pixel in the dead angle regions 33 and 34 in which the same screen image, for example, the screen image of "background" exists in the original image is corrected by an image drawing content "copying processing" inputted to the stereoscopic image information correcting section 23 via the input section 24. Thus, the stereoscopic image information correcting section 23 generates an image in the dead angle regions 33 and 34, respectively by copying the pixel value of the same screen image ("background"). The value of the pixel in the dead angle region 35 in which the same screen image does not exist in the original image is rectified by an image drawing content "image drawing processing" and an image drawing instruction inputted to the stereoscopic image information correcting section 23 via the input section 24. Thus, the stereoscopic image information correcting section 23 generates an image in the dead angle region 35 in accordance with the image drawing instruction.

In drawing an image in the dead angle region 35 of the image information for the left eye, based on the image information for the left eye which the image information output section 17 has read from the stereoscopic image information storing section 16, only the image for the left eye is displayed on the image display section 20 under the control of the gate 18. Watching the dead angle region 35 of the image for the left eye displayed on the image display section 20, the operator draws the image in the dead angle region 35.

The stereoscopic image information storing section 16 stores the pixel value of each dead angle region generated by copying processing or image drawing processing at an address thereof corresponding to each dead angle zone.

Figure 11:
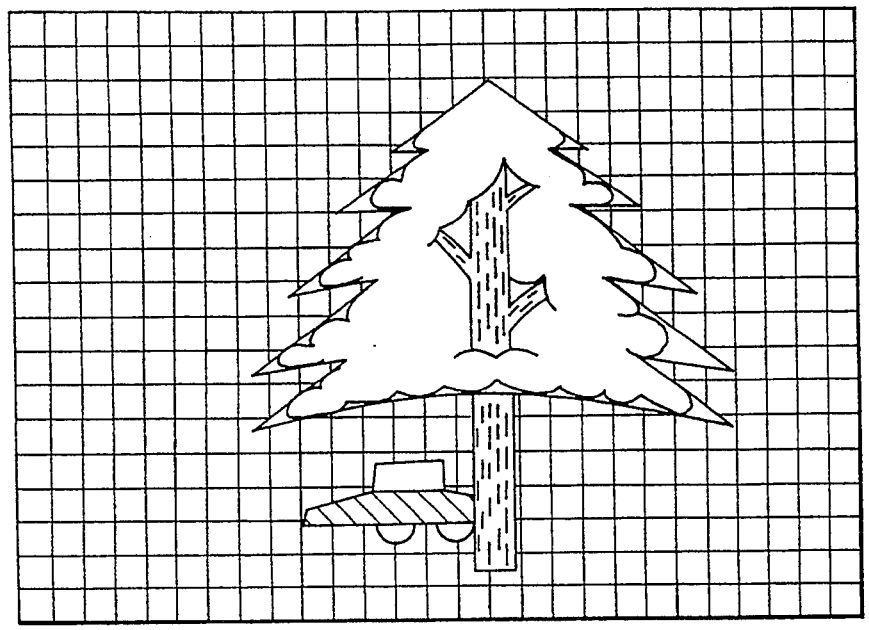
FIG. 11 is a view showing an example of an image for the left eye formed based on a corrected image information for the left eye.
Figure 12:
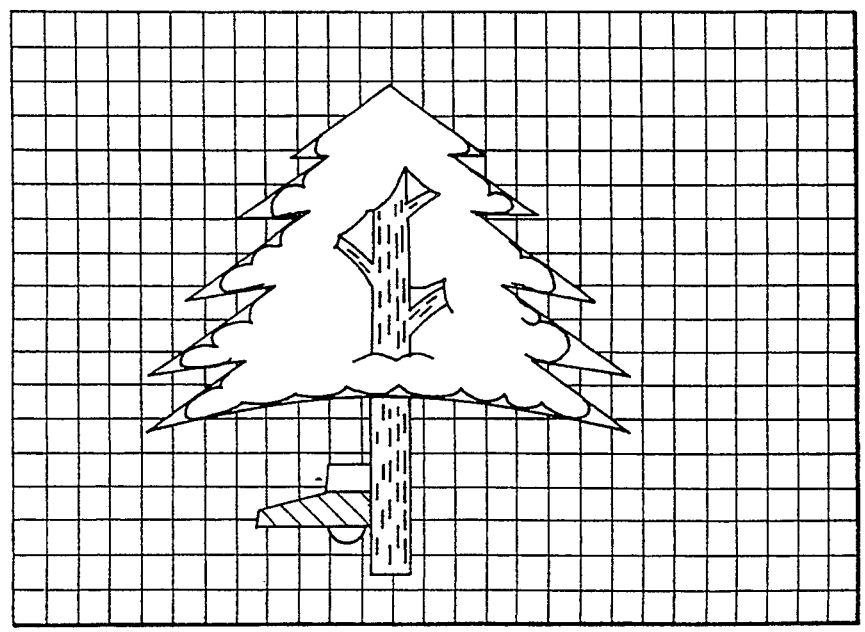
FIG. 12 is a view showing an example of an image for the right eye formed based on a corrected image information for the right eye.

As a result of the correction of the image information for the left eye representing the image for the left eye as shown in FIG. 9, image information for the left eye as shown in FIG. 11 is obtained. Similarly, as a result of the correction of the image information for the right eye representing the image for the right eye as shown in FIG. 10, image information for the right eye as shown in FIG. 12 is obtained.

Figure 13:
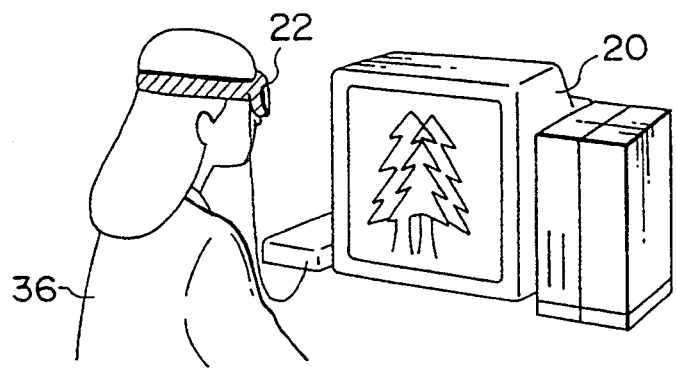
FIG. 13 is a view showing a state in which the image for the left eye and that for the right eye are being displayed.

Based on the stereoscopic image information thus generated and stored in the stereoscopic image information storing section 16, the image for the left eye and the image for the right eye are alternately displayed on the image display section 20 as shown in FIG. 13 by the operation of the gate 18. The operator 36 puts on the liquid crystal shutter glasses 22 which is controlled by the stereoscopic section 21 so as to see the screen. Thus, the operator 36 can see the stereoscopic images thereon.

Description is made below on operation for displaying a stereoscopic image on the screen of the image display section 20 by alternately displaying the image for the left eye and the image for the right eye.

The display of the stereoscopic image is accomplished by the image information output section 17, the gate 18, and the stereoscopic section 21 under the control of the CPU 25. The CPU 25 controls the operation of the gate 18 and the stereoscopic section 21 synchronously with the vertical synchronizing signal.

Description is made below on the operation for displaying a stereoscopic image on the screen of the image display section 20 to be executed by the CPU 25 in synchronization with the vertical synchronizing signal.

Figure 14:
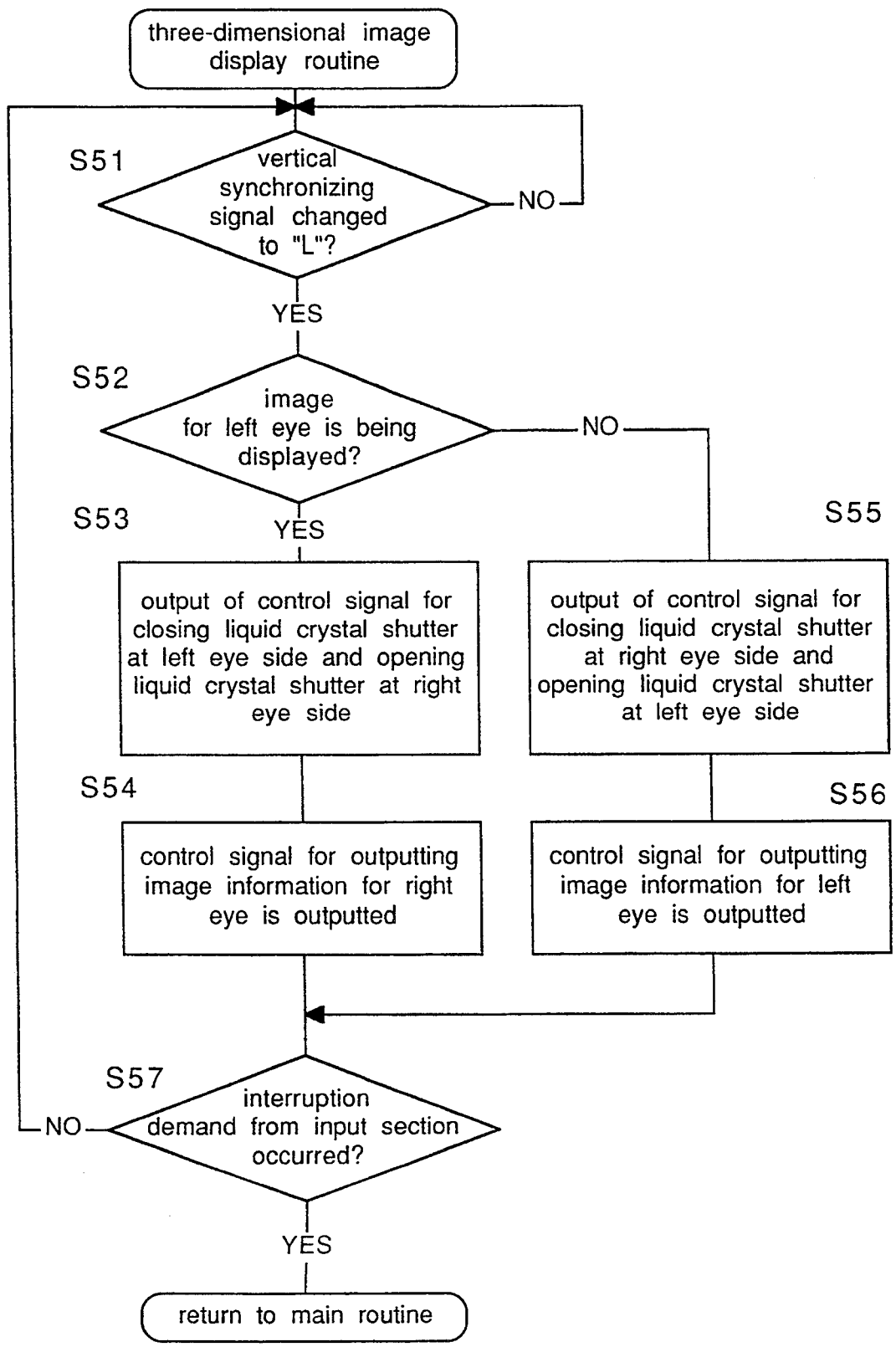
FIG. 14 is a flowchart of a display routine of a stereoscopic image.

The operation for displaying a stereoscopic image information is described below in detail with reference to FIG. 14 which is a flowchart of a stereoscopic image displaying routine to be executed under the control of the CPU 25.

The CPU 25 executes interruption processing in response to a demand for displaying a stereoscopic image outputted from the input section 24, thus executing the operation of the stereoscopic image displaying routine.

At step S51, it is decided whether or not the level of the vertical synchronizing signal has changed from "H" (high) to "L" (low). If yes, the program goes to step S52.

It is decided at step S52 whether or not an image being displayed on the image display section 20 is the image for the left eye based on the content of a control signal outputted to the gate 18. If yes, the program goes to step S53. If no, the program goes to step S55.

At step S53, a control signal instructing the closing of the liquid crystal shutter positioned on the left eye side and the opening of the liquid crystal shutter positioned on the right eye side is outputted from the CPU 25 to the stereoscopic section 21.

At step S54, the CPU 25 outputs a control signal instructing the output of the image information for the right eye to the gate 18.

As a result, the liquid crystal shutter positioned on the left eye side is closed and the liquid crystal shutter positioned on the right eye side is opened. Consequently, the image for the right eye is displayed on the screen of the image display section 20.

At step S55, a control signal instructing the closing of the liquid crystal shutter positioned on the right eye side and the opening of the liquid crystal shutter positioned on the left eye side is outputted from the CPU 25 to the stereoscopic section 21.

At step S56, the CPU 25 outputs a control signal instructing the output of the image information for the left eye to the gate 18.

As a result, the liquid crystal shutter positioned on the left eye side is opened and the liquid crystal shutter positioned on the right eye side is closed. Consequently, the image for the left eye is displayed on the screen of the image display section 20.

It is decided at step S57 whether or not an interruption demand for stopping the display of the stereoscopic image information has been inputted from the input section 24. If no, the program returns to step S51 so as to execute a subsequent frame. If yes, the program returns to the main routine.

While the program repeatedly goes from step 551 to step S57 until the CPU 25 receives the interruption demand for stopping the display of the stereoscopic image information from the input section 24, the stereoscopic image is displayed on the screen of the image display section 20 and the liquid crystal shutter positioned on the right eye side and the shutter positioned on the left eye side are closed alternately with each other.

Figure 15:
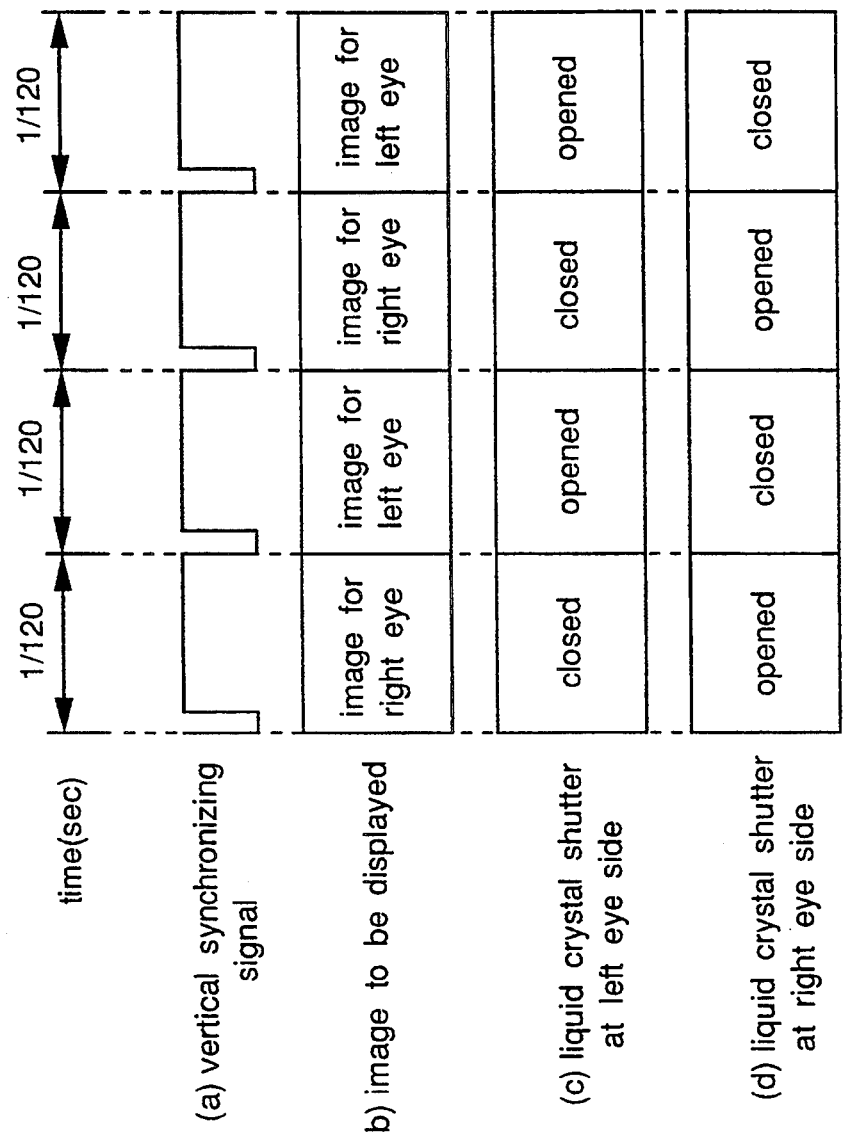
FIG. 15 is a timing chart during the display of a stereoscopic image.
Figure 16:
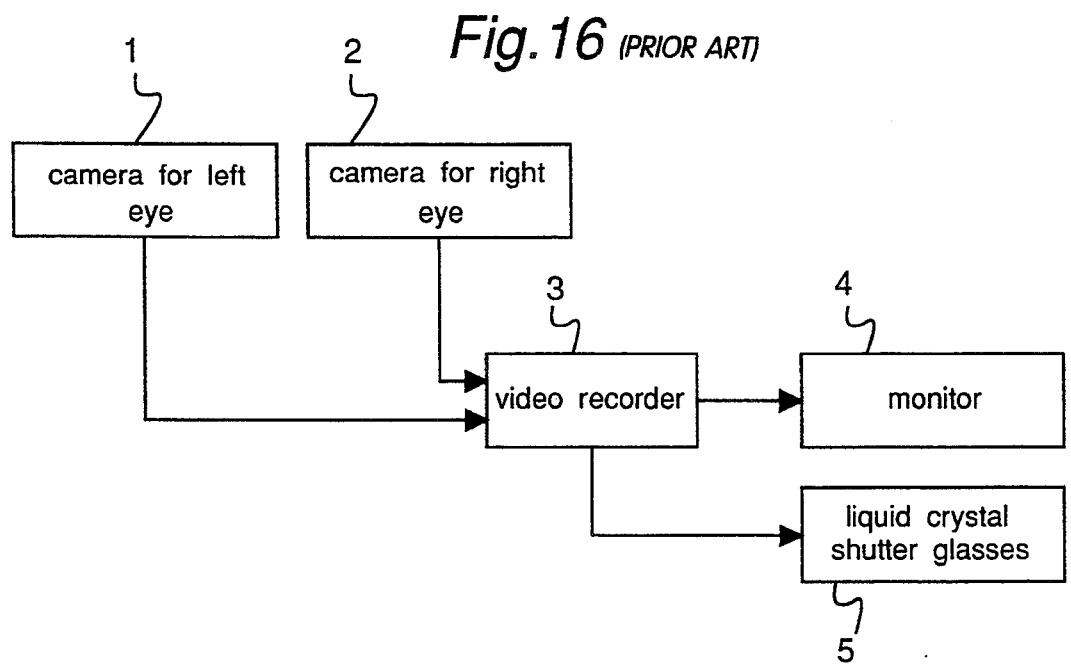
FIG. 16 is an illustration of a conventional method for obtaining a stereoscopic image.
Figure 17:
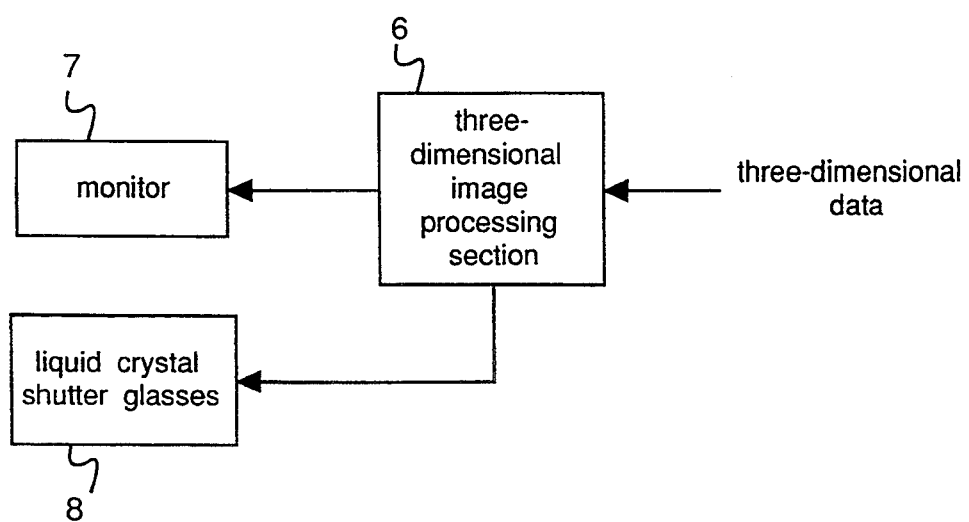
FIG. 17 is an illustration of another conventional method for obtaining a stereoscopic image.

When the above stereoscopic image is being displayed, the level of the vertical synchronizing signal changes; the image for the left eye and the image for the right eye are alternately displayed on the screen; and the liquid crystal shutter on the left eye side and the shutter on the right eye side are closed and opened as shown in FIG. 15 which is a timing chart. The level of the vertical synchronizing signal changes from "H" to "L" every 1/120 seconds. In synchronization with the level change of the vertical synchronizing signal, the control for opening and closing the liquid crystal shutter of the liquid crystal shutter glasses 22 and the control for alternately displaying the image for the left eye and the image for the light eye is made.

As described above, according to the embodiment, the depth gradation value of each region in the original image which is based on the two-dimensional image information outputted from the image input section 11 is designated by the depth information inputted through the input section 24. Then, the depth information generating section 13 generates the depth image information represented by brightness information according to the designated depth gradation.

Then, based on the equation (1), the stereoscopic image information generating section 15 calculates the value of the distance (d), namely, ½ of the parallax of the screen image in the left eye and that for the right eye and then, generates the image information for the left eye and that for the right eye based on the value of the calculated distance (d) and the two-dimensional image information. At this time, the pixel value of a region in which the screen image of an object forward and the screen image of an object backward therein overlap with each other is set to the pixel value of the forward object in the two-dimensional image information.

The image information output section 17 reads the stereoscopic image information comprising the image information for the left eye and the image information for the right eye thus generated, and the image for the left eye and the image for the right eye are alternately displayed on the screen of the image-display section 20 at regular time intervals under the control of the gate 18. Therefore, the operator can see the image for the left eye with the left eye and the image for the right eye with the right eye through the shutters of the liquid crystal shutter glasses 22 which are opened and closed by the control of the stereoscopic section 21 in synchronization with the operation of by the gate 18 for switching the image for the left eye to the image for the right eye or vice versa.

Thus, the operator can feel the depth of each object according to the dislocation amount of the screen image of an object in the left eye and that for the right eye, thus feeling that the object stereoscopic.

According to the embodiment, it is not necessary for the operator to form a three-dimensional object or generate/input a large number of data of a three-dimensional configuration, but only designates the depth gradation value of each region of the original image, thus generating stereoscopic image information easily in a short period of time based on the two-dimensional image information.

In order to generate the pixel value of a dead angle region which is caused by the difference between the distance (d) of the screen image of an object forward in the image for the left eye and the right eye and the distance (d) of the screen image of an object backward in the image for the left eye and the right eye, the stereoscopic image information correcting section 23 executes image copying processing or image drawing processing according to an image drawing content or an image drawing instruction inputted by the operator via the input section 24.

Therefore, even though an object is complicated in its configuration, stereoscopic image information can be generated based on two-dimensional image information.

In order to generate stereoscopic image information in the dead angle regions 33, 34 or 35, the operator designates copying processing or image drawing for each dead angle region through the input section 24. However, the present invention is not limited to this way of copying processing or image drawing.

For example, copying processing is performed for each dead angle regions. That is, of pixels constituting the outline of each dead region, the values of the pixels of a backward object are repeatedly copied horizontally. For example, of pixels constituting the outline of the dead angle region 33, the values of pixels constituting the screen image of "background" which is positioned more backward than "tree" are repeatedly copied horizontally in the right direction. In the case of the dead angle region 35, the values of pixels constituting the screen image of "automobile" which is positioned more backward than "tree" are repeatedly copied horizontally in the right direction.

The screen image of each dead angle region thus formed is evaluated by the image display section 20. If, of the pixels constituting the outline of the dead angle region 35, the pixels constituting the screen image of "automobile" are the pixel representing "door" of "automobile" the screen image of "door" greater than the actual width is drawn in the dead angle region 35, the image drawing processing is executed only for a dead angle region required to be corrected, which lightens the operator's burden in generating a stereoscopic image.

The present invention is not limited to the above embodiment in which depth image information of one object is represented by the value of one kind of depth image information. It is possible to separate an object more finely into forward regions and backward regions so as to represent the object by means of a greater number of depth image information. Thus, the apparatus provides a more stereoscopic image.

The algorithm of calculating the distance (d), the processing for generating the image information for the left eye and the right eye, and the processing for displaying the stereoscopic image is not limited to the algorithm of the above-described embodiment.

The present invention is not limited to the method to be carried out by the depth information generating section 13 which generates depth image information indicated by brightness information as depth information.

The stereoscopic image information storing section 16 of the above embodiment may be constituted by an external storing means so as to retain the stereoscopic image information.

Instead of the liquid crystal shutter glasses 22, shutter-provided glasses having other means may be used to view the image for the left eye and that for the right eye.

The image input section 11 may comprise other optical instruments instead of a camera or an image scanner in obtaining two-dimensional image information.

For example, the image input section 11 may be provided with an image drawing means for generating two-dimensional image information according to the image drawing information of an object inputted from the input section 24. Thus, a stereoscopic image information can be easily created.

As apparent from the foregoing description, according to the apparatus of the first invention, the depth information generating section separates the depths of a plurality of positions in the original image which is based on the two-dimensional image information inputted via the image input section into a plurality of classes in response to the depth information outputted from the input section and generates depth information representing the class of the depth of each pixel in the two-dimensional image information.

Then, based on the two-dimensional image information and the depth information, the stereoscopic image information generating section generates stereoscopic image information consisting of image information for the left eye and that for the right eye according to a predetermined rule. The image display section performs a switching operation of alternately displaying an image for the left eye and an image for the right eye on the screen of the image display section. In synchronization with the switching operation, the shutter of the glasses positioned on the right eye side is closed under the control of the shutter control section when the image for the left eye is displayed on the screen of the image display section, while the shutter of the glasses positioned on the left eye side is closed under the control of the shutter control section when the image for the right eye is displayed on the screen of the image display section.

Thus, the operator can see the image for the left eye with the left eye and the image for the right eye with the right eye almost simultaneously, thus viewing a stereoscopic image.

According to the first embodiment, it is not necessary for the operator to form a three-dimensional object or generate/input a large number of data concerning a three-dimensional configuration, but can easily generate complicated stereoscopic image such as a landscape by only inputting the depth information via the input section.

According to the apparatus of the second embodiment, when the depth information is generated by the depth information generating section, the brightness information generating means generates depth image information representing the class of the depth of each pixel in the two-dimensional image information in terms of brightness information. As a result, the image display section displays the depth image which is based on the depth image information on the screen thereof. Thus, the brightness degree of the depth image allows the operator to recognize the depth degree of each region in the original image.

Therefore, the operator checks the depth degree of each region of the original image to have a stereoscopic image information generated before a stereoscopic image is displayed on the screen. Thus, the stereoscopic image of an object with a complicated configuration such as a landscape can be easily generated.

According to the apparatus of the third embodiment, based on the image drawing information inputted via the input section, the stereoscopic image information correcting section corrects the stereoscopic image information stored in the stereoscopic image information storing section by generating, by a predetermined procedure, the image information of a dead angle region which is not visible in the original image but visible in the image for the left eye and that for the right eye owing to the shift of the visual point.

Thus, the stereoscopic image of an object with a very complicated configuration can be easily generated.

According to the apparatus of the fourth embodiment, based on the image drawing information of the object inputted by the input section, two-dimensional image information representing the image of the object is generated by the image drawing means of the image input section and stored in the two-dimensional image information storing section.

Therefore, the stereoscopic image information of a picture such as an illustration can be easily generated, based on the image drawing information inputted by the input section.

According to the apparatus of the fifth embodiment, the stereoscopic image information storing section is constituted by the external storing means.

Therefore, the stereoscopic image information which provides a complicated configuration such as a landscape can be easily generated and stored. In addition, a stereoscopic image which is based on the stored stereoscopic image information can be repeatedly displayed as necessary.

According to the apparatus of the sixth embodiment, the depths of a plurality of positions in an original image which is based on the two-dimensional image information representing the image of the object are separated into a plurality of classes, and depth information representing the class of the depth of each pixel in the two-dimensional image information is generated. Image information for the left eye and that for the right eye are generated based on a parallax of a pixel in left eye-image information which is based on the depth information and that of a corresponding pixel in right eye-image information which is based on the depth information and the two-dimensional image information. The image for the left eye which is based on the left eye-image information and that for the right eye which is based on the right eye-image information are alternately displayed on the screen of the image display section at predetermined regular time intervals.

According to the sixth embodiment, it is not necessary for the operator to form a three-dimensional object or generate/input a large number of data indicating three-dimensional configuration, but only separates the depths of positions in the original image into a plurality of classes, thus easily generating a complicated stereoscopic image such as a landscape image.

According to the apparatus of the seventh embodiment, depth image information representing the class of the depth of each pixel in the two-dimensional image information is generated as depth information. Depth image representing the class of the depth at each position in the original image in terms of brightness degree is displayed as necessary based on the depth image information thus generated. The parallax of a pixel in the left eye-image information and that of a corresponding pixel in the right eye-image information is found based on the depth image information by assuming that a position corresponding to a brighter pixel in the depth image information is forward in the original image and a position corresponding to a darker pixel in the depth image information is backward in the original image.

Consequently, the depth degree of each region can be recognized by the depth image which is based on the depth image information.

Therefore, after the operator confirms the depth degree of each position of the entire original image of the object, the operator generates stereoscopic image information and can generate a stereoscopic image complicated in ins configuration such as a landscape image.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An apparatus for generating a stereoscopic image of an original object comprising:

an image input section for picking up the image of the object and outputting two-dimensional image information indicating said picked-up image;

a two-dimensional image information storing section for storing said two-dimensional image information outputted from said image input section;

an input section for inputting information for designating the class of depth at each position in said image of the object which is based on said two-dimensional image information;

a depth information generating section for dividing the depth at each position in said image of the object according to the class of depth information inputted from said input section and generating depth information indicating the depth at each pixel in said two-dimensional image information;

a depth information along storing section for storing the depth information generated by said depth information generating section;

a stereoscopic image information generating section for generating stereoscopic image information including stereoscopic image information for, according to a predetermined rule, displaying an image to be viewed from the visual point of the left eye and stereoscopic image information for displaying an image to be viewed from the visual point of the right eye, based on said two-dimensional image information stored in said two-dimensional image information storing section and said depth information stored in said depth information storing section;

a stereoscopic image information storing section for storing said stereoscopic image information generated by said stereoscopic image information generating section;

an image display section for reading and displaying the stereoscopic image information for the left eye and the stereoscopic image information for the right eye alternately from said stereoscopic image information stored in said stereoscopic image information storing section and performing a switching operation of alternately displaying said image for the left eye and said image for the right eye on a screen thereof at predetermined regular time intervals;

shutter-provided glasses for viewing the image for the left eye and said image for the right eye displayed on said image display section; and a shutter control section, operating in synchronization with said switching operation performed by said image display section, for closing a right eye side shutter when said stereoscopic image for the left eye is displayed on the screen of said image display section and closing a left eye side shutter when said stereoscopic image for the right eye is displayed on the screen of said image display section.

2. An apparatus for generating a stereoscopic image as defined in claim 1, wherein said depth information generating section includes brightness information generating means for generating depth image information serving as depth information representing the class of the depth of each pixel in said two-dimensional image information by brightness information;

and wherein said image display section reads out said depth image information to display said depth image representing the class of the depth at each position in said image of the object by brightness degree on the screen thereof.

3. An apparatus for as defined in claim 2, wherein in addition to said depth information, said input section inputs image drawing information for a stereoscopic image which is based on said stereoscopic image information generated by said stereoscopic image information generating section;

said apparatus further comprising: a stereoscopic image information correcting section for, based on said image drawing information inputted by said input section, correcting said stereoscopic image information by generating the image information of a dead angle region which cannot be seen in said original image but can be viewed in the image for the left eye and the right eye by the movement of the visual point according to a predetermined procedure.

4. An apparatus as in claim 3 wherein said image input section includes image drawing means for generating two-dimensional image information representing the image of said object, based on said image drawing information or said object inputted by said input section.

5. An apparatus as in claim 4 wherein said stereoscopic image information storing section is composed of external storing means.

6. An apparatus as in claim 2 wherein said image input section includes image drawing means for generating two-dimensional image information representing the image of said object, based on said image drawing information for said object inputted by said input section.

7. An apparatus as in claim 6 wherein said stereoscopic image information storing section is composed of external storing means.

8. An apparatus as in claim 2 wherein said stereoscopic image information storing section is composed of external storing means.

9. An apparatus for generating a stereoscopic image as defined in claim 1, wherein in addition to said depth information, said input section inputs image drawing information for a stereoscopic image which is based on said stereoscopic image information generated by said stereoscopic image information generating section;

said apparatus further comprising: a stereoscopic image information correcting section for, based on said image drawing information inputted by said input section, correcting said stereoscopic image information by generating the image information of a dead angle region which cannot be seen in said original image but can be viewed in the image for the left eye and the right eye by the movement of the visual point according to a predetermined procedure.

10. An apparatus as in claim 9 wherein said image input section includes image drawing means for generating two-dimensional image information representing the image of said object, based on said image drawing information for said object inputted by said input section.

11. An apparatus as in claim 10 wherein said stereoscopic image information storing section is composed of external storing means.

12. An apparatus as in claim 9 wherein said stereoscopic image information storing section is composed of external storing means.

13. An apparatus for generating a stereoscopic image as defined in claim 1, wherein said image input section includes image drawing means for generating two-dimensional image information representing the image of said object, based on said image drawing information for said object inputted by said input section.

14. An apparatus as in claim 13 wherein said stereoscopic image information storing section is composed of external storing means.

15. An apparatus for generating a stereoscopic image as defined in claim 1, wherein said stereoscopic image information storing section is composed of external storing means.

16. A method for generating a stereoscopic image including an image for the left eye to be viewed from the visual point thereof and another image for the right eye to be viewed from the visual point thereof, said method comprising the steps of:

generating two-dimensional image information representing the image of an object;

separating the depth at each position in said image of the object, which is based on said two-dimensional image information, into a plurality of classes and generating depth information representing the depth of each pixel in said two-dimensional image information;

finding the parallax of a pixel in left eye-image information for displaying the image for the left eye and that of a corresponding pixel in right eye-image information for displaying the another image for the right eye, based on said depth information;

generating stereoscopic image information including said image information for the left eye and said image information for the right eye, based on the parallax found and said two-dimensional image information; and displaying said image for the left eye which is based on said left eye-image information and said another image for the right eye which is based on said right eye-image information alternately at predetermined regular time intervals.

17. A method for generating a stereoscopic image as defined in claim 16, further comprising the steps of:

generating depth image information representing the class of the depth of each pixel in said two-dimensional image information as depth information:

displaying depth image information representing the class of the depth at each position in said image of the object based on the depth image information generated; and finding the parallax of a pixel in said left eye-image information and that of a corresponding pixel in said right eye-image information, based on said depth image information serving as said depth information by assuming that a position corresponding to a brighter pixel of said depth image information is forward in said original image and a position corresponding to a darker pixel of said depth image information is background in said original image.

* * * * *